United States Patent
Shahar et al.

(10) Patent No.: US 10,498,662 B2
(45) Date of Patent: Dec. 3, 2019

(54) SYSTEM AND METHOD FOR AUTOMATIC PACKET FIELD SUPRESSION IN BROADBAND WIRELESS COMMUNICATIONS SYSTEMS

(71) Applicant: Ondas Networks Inc., Sunnyvale, CA (US)

(72) Inventors: Menashe Shahar, Los Altos, CA (US); Guy Robert Simpson, Los Gatos, CA (US)

(73) Assignee: Ondas Networks Inc., Sunnyvale, CA (US)

( * ) Notice: Subject to any disclaimer, the term of this patent is extended or adjusted under 35 U.S.C. 154(b) by 45 days.

(21) Appl. No.: 15/392,156

(22) Filed: Dec. 28, 2016

(65) Prior Publication Data

US 2017/0187636 A1   Jun. 29, 2017

Related U.S. Application Data

(60) Provisional application No. 62/272,462, filed on Dec. 29, 2015.

(51) Int. Cl.
*H04L 12/823*   (2013.01)
*H04W 28/02*   (2009.01)

(52) U.S. Cl.
CPC ......... *H04L 47/32* (2013.01); *H04W 28/0289* (2013.01)

(58) Field of Classification Search
CPC ........................... H04L 47/32; H04W 28/0289
USPC ........................................................ 370/230
See application file for complete search history.

(56) References Cited

U.S. PATENT DOCUMENTS

2009/0177951 A1\* 7/2009 Lee ................... H03M 13/3994
714/799
2009/0190612 A1\* 7/2009 Bae ........................ H04L 69/04
370/477

\* cited by examiner

*Primary Examiner* — Huy D Vu
*Assistant Examiner* — Nizam U Ahmed
(74) *Attorney, Agent, or Firm* — Pearl Cohen Zedek Latzer Baratz LLP

(57) ABSTRACT

A method for packet field suppression in broadband wireless communication is provided. Values for packet suppression can be learned and subsequently used for suppression. The learning can involve determining a new packet field suppression rule and a packet field suppression index. Packets can be suppressed based on the learned values.

9 Claims, 6 Drawing Sheets

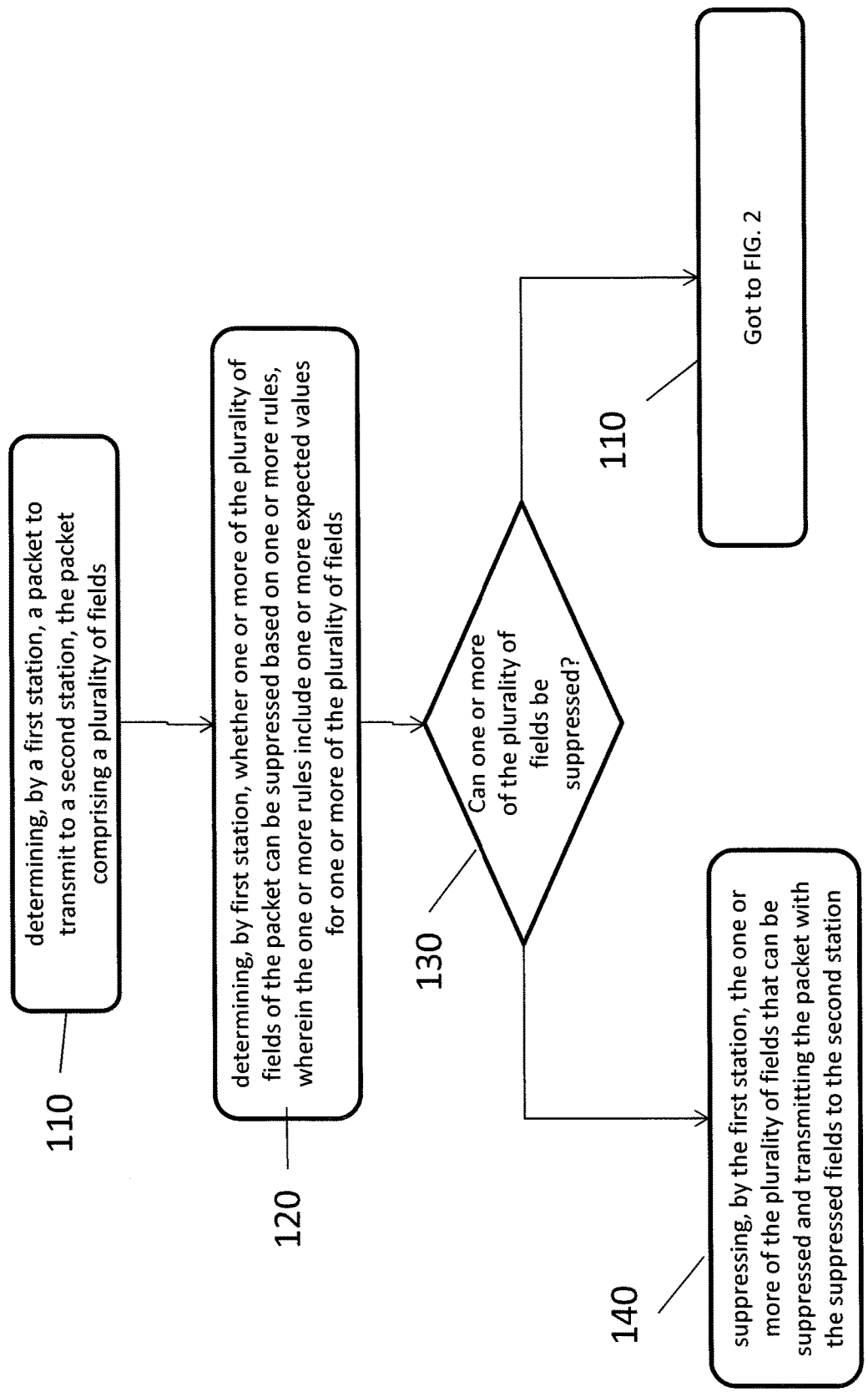

SYSTEM AND METHOD FOR AUTOMATIC PACKET FIELD SUPRESSION IN BROADBAND WIRELESS COMMUNICATIONS SYSTEMS

CROSS REFERENCE TO RELATED APPLICATION

This application claims benefit of and priority to U.S. Provisional Patent Application No. 62/272,462, filed on Dec. 29, 2015, the entire contents of which are herein incorporate by reference in its entirety.

FIELD OF THE INVENTION

The present invention relates generally to wireless networks, and in particular to a method and system for automatic learning for packet field suppression to improve efficiency of broadband wireless communication.

BACKGROUND OF THE INVENTION

Broadband wireless communication systems (e.g., WIMAX) can provide broadband communication access to users. Broadband wireless communication systems can include one or more communication stations (e.g., base stations (BS) and remote stations (RS)). The BS and RS can communicate via packets. The packets can include the communication data (e.g., the data that the user wishes to communicate) and additional data that the system can use (e.g., header data).

Some broadband communication systems comply with an IEEE 802.16, such that a station (e.g., base station (BS)) may utilize a type of packet header suppression as is described in the standards. Typically, when a transmitting station (e.g., RS or BS) transmits a packet to a receiving station (e.g., BS or RS, respectively), there may be fields in the packet that are repetitive. Current methods for suppressing these repetitive fields in the packet can require that the exact fields in the packet to suppress and the values of those fields be known in advance and set in the transmitting and receiving stations. In addition, the known values can be limited to one value per field. For example, suppression of an IP address having three values is not allowed by current systems.

Accordingly, it can be desirable to have a packet data suppression that can suppress fields having values that are not pre-defined and/or suppress fields having more than one value.

SUMMARY OF EMBODIMENTS OF THE INVENTION

In one aspect, the invention involves a method for packet field suppression in broadband wireless communication. The method can involve determining, by a first station, a packet to transmit to a second station, the packet comprising a plurality of fields. The method can also involve determining, by first station, whether one or more of the plurality of fields of the packet can be suppressed based on one or more rules, wherein the one or more rules include one or more expected values for one or more of the plurality of fields. The method can also involve, if one or more of the plurality of fields can be suppressed, then suppressing, by the first station, the one or more of the plurality of fields that can be suppressed and transmitting the packet with the suppressed fields to a second station. The method can also involve if one or more of the plurality of fields cannot be suppressed, then: i) sending, by the first station, the packet without suppressing any of the plurality of fields to the second station, ii) determining, by the first station, a new packet field suppression rule based on one or more unexpected values for the one or more plurality of fields, iii) assigning, by the first station, a packet field suppression index value to the new packet field suppression rule, iv) transmitting, by the first station, the new packet field suppression rule and the packet field suppression index to the second station, and v) upon receipt of an acknowledgment by the second station, storing, by the first station, the new packet field suppression rule and the packet field suppression index.

In some embodiments, the method involves determining whether any of the plurality of fields can be suppressed further comprises comparing the one or more rules to MAC service data unit parameters. In some embodiments, the method involves storing the new packet field suppression rule further comprises storing the new packet field suppression rule in a liner array.

In some embodiments, the method involves storing the new packet field suppression rule further comprises storing the new packet field suppression rule by creating a table for each unique field type of the new packet field suppression rule. In some embodiments, the method involves transmitting the new packet field suppression rule and the packet field suppression index to the second station further comprises populating a dynamic service flow change message.

In some embodiments, the first station is a base station and the second station is a remote station. In some embodiments, the first station is a remote station and the second station is a base station. In some embodiments, the field to be suppressed are packet header fields. In some embodiments, the packet is in accordance with IEEE 802.16 standards.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A is a flow diagram for a method for packet field suppression in a broadband wireless communication system, according to an illustrative embodiment of the invention;

Figure 1B:
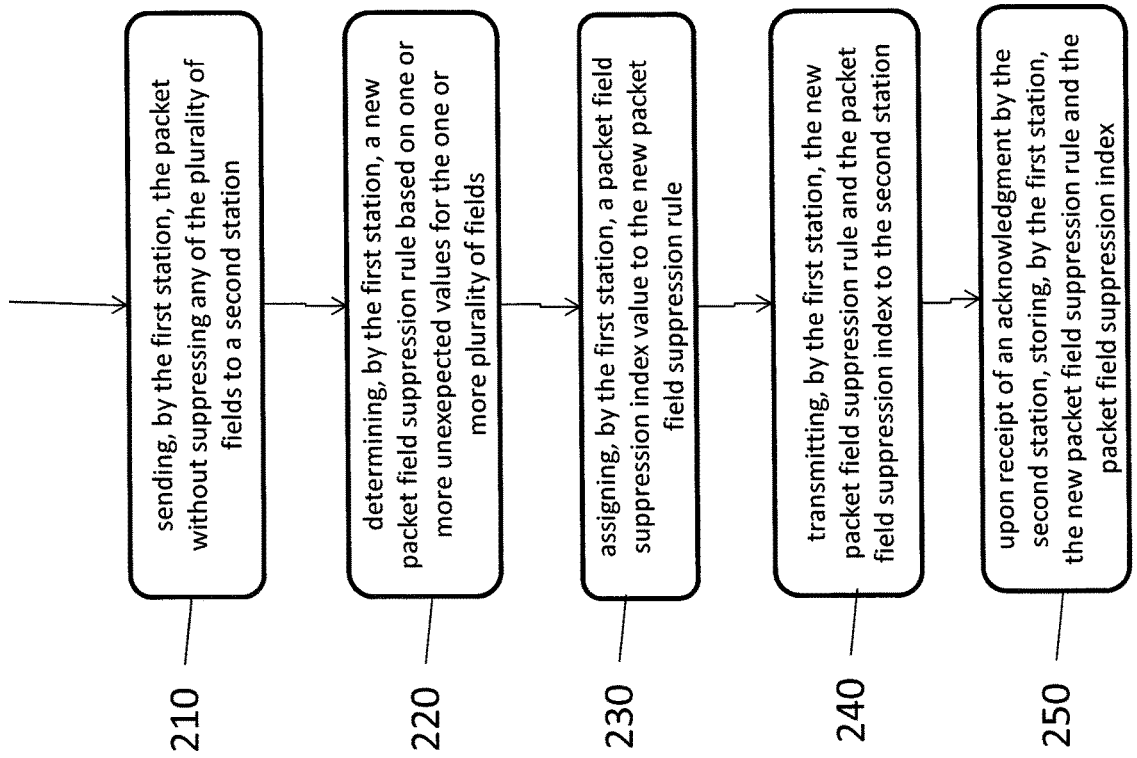
FIG. 1B is a flow diagram for a method for automatic learning for field suppression in a broadband wireless communication system, according to an illustrative embodiment of the invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

In the descriptions that follow, embodiments of the invention are described in connection with respect to broadband wireless systems employing standards, such as used in IEEE 802.16 and LTE standards. However, it is understood by one of ordinary skill in the art that the present invention may be used in a variety of broadband wireless systems in which packet suppression in a transmitting station and a receiving station is desired.

In general, a method for packet suppression in a broadband wireless communication system is provided. A base station (BS) and/or a receiving station (RS) can transmit messages in packets (e.g., in accordance with the IEEE 802.16 standards). The packets can have a maximum size (e.g. max number of bytes), and a plurality of predefined fields (e.g., as is the case with packets transmitted according to the 802.16 standards).

Any field in the packet can be suppressed without having the values of the packet fields for suppression specified. The packet field values to suppress can be automatically learned by the station transmitting the packet, and transmitted to the station receiving the packet, such that in a subsequent communication the learned values can be used for field suppression. In this manner, the values to suppress can be learned instead of pre-programmed, which can increase an amount of suppression in a communication system.

FIG. 1A is a flow diagram for a method for packet header suppression in a broadband wireless communication system, according to an illustrative embodiment of the invention;

The method can involve determining, by a first station, a packet to transmit to a second station, the packet comprising a plurality of fields (Step 110). The first station can be base station (BS) and the second station can be a remote station (RS), e.g., in the downlink. The second station can be base station (BS) and the first station can be a remote station (RS), e.g., in the uplink. The broadband wireless communication system can employ communication via the IEEE 802.16 standard. The packet fields can include a header. For embodiments in accordance with IEEE 802.16 standard, the header of the packet can include MAC service data unit parameters.

The packet to transmit can be based on a packet received by the first station on an internet port of the first station, and the determined packet can be transmitted to the second station from a wireless port of the first station. The packet to transmit can be based on a packet received by the first station on a wireless port of the first station, and the determined packet can be transmitted to the second station from an internet port of the first station.

The method can also involve determining, by the first station, whether one or more of the plurality of fields of the packet can be suppressed based on one or more rules (Step 120). The one or more rules can be one or more expected values for one or more of the plurality of fields. The one or more rules can include a packet field definition and/or a packet field value definition.

In some embodiments, the one or more rules are stored in a linear array of bytes. In some embodiments, for networks employing the IEEE 802.16 standard, dynamic service flow change messages allow for addition and/or deletion of payload header service (PHS) rules to already existing service flows.

Figure 2A:
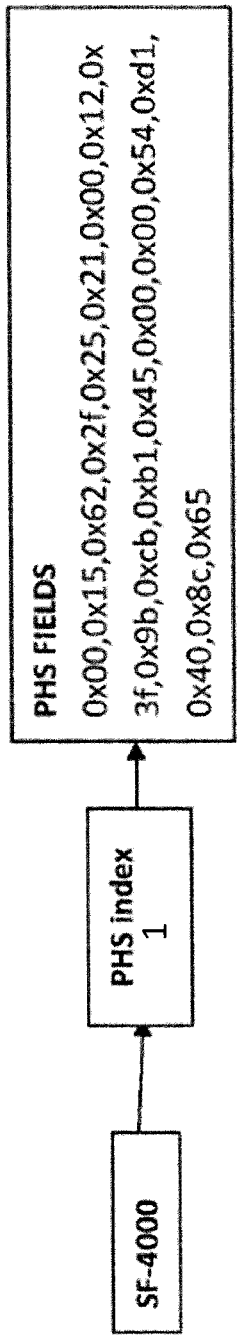
FIG. 2A and FIG. 2B are examples of rule formats, in accordance with illustrative embodiments of the invention.

For example, a rule can include for a service flow=4000, packet suppression index of 1, packet header fields/values: dst MAC address=0x00,0x15,0x62,0x2f,0x25,0x2; src MAC addrs=0x00,0x12,0x3f,0x9b,0xcb,0xb; dst IP addrs 0x45,0x00,0x00,0x54; and src IP addrs=0xd1, 0x40, 0x8c, 0x65, with a packet header suppression index of 1. The rule corresponding to this packet can be stored as shown in FIG. 2A.

The first station can determine whether all of the fields of the plurality of fields can be suppressed by identifying which fields in the packet can be suppressed. The fields in the packet that can be suppressed can correspond to the fields in the one or more rules. In some embodiments, the fields that can be suppressed include any field in a header of the packet. In some embodiments, the fields that can be suppressed can be configured. For example, configured by an administrator, any user, based on a type of communication to be transmitted over the network (e.g., text, talk, and/or video), and/or based on a communication protocol of the network).

In various embodiments, the fields in the packet that can be suppressed are IP_Protocol, IP_Source_Address, IP-Destination_Address, Source_Port, Destination_port, Destination_MAC_Address, Source_MAC_Address, Ethernet_Protocol, or any combination thereof.

For each field in the packet that can be suppressed, the value of that respective field can be compared against the values in a respective rule (e.g., a rule that has the same field type as the field type of the packet value being evaluated). If all of the fields that can be compressed in the packet have a value that corresponds to the values of a rule, then it is determined that the one or more fields of the plurality of fields can be suppressed. For example, if a packet has a dst MAC address=0x00,0x15,0x62,0x2f,0x25,0x2, then using the rule of FIG. 2A, the dst MAC addrs can be suppressed because the rule of FIG. 2A has a value for the dst MAC addrs equal to that of the rule shown in FIG. 2A.

If no field in the packet has a value that corresponds to a value of a rule having the same field, then it is determined that no fields in the packet can be suppressed.

If one or more fields of the plurality of fields in the packet can be suppressed (Step 130), then suppressing, by the first station, the one or more of the plurality of fields that can be suppressed and transmitting the packet with the suppressed fields to the second station (Step 140). If one or more fields of the plurality of fields in the packet cannot be suppressed (Step 130), then the method can involve one ore more steps as described in FIG. 1B.

For example, assume a packet having a header, having a service flow=4000, the packet having a dst MAC address=0x00,0x15,0x62,0x2f,0x25,0xaa; src MAC addrs=0x00,0x12,0x3f,0x9b,0xcb,0xb1; dst IP addrs 0x45, 0x00,0x00,0x54; and src IP addrs=0xd1, 0x40, 0x8c, 0x0c. Comparing this packet to the rule in FIG. 2A shows that the dst IP addrs and the src IP addrs do not match the rule in FIG. 2A, thus it is determined that the packet cannot be suppressed.

FIG. 1B is a flow diagram for a method for automatic learning for header suppression in a broadband wireless communication system, according to an illustrative embodiment of the invention.

The method can involve sending, by the first station, the packet without suppressing any of the plurality of fields to the second station (Step 210).

The method can also involve determining, by the first station, a new packet field suppression rule based on one or more unexpected values for the one or more plurality of fields (Step 220). The new packet field suppression rule can be based on the identified fields in the packet that can be suppressed (e.g., packets that can be suppressed as described above in FIG. 1A, Step 120). The new packet field suppression rule can involve for each field in the packet that can be suppressed but that does not have matching rule (e.g., a rule that has a value matching the value in the packet with the same field), creating a rule for the field having the corresponding value.

Figure 2B:
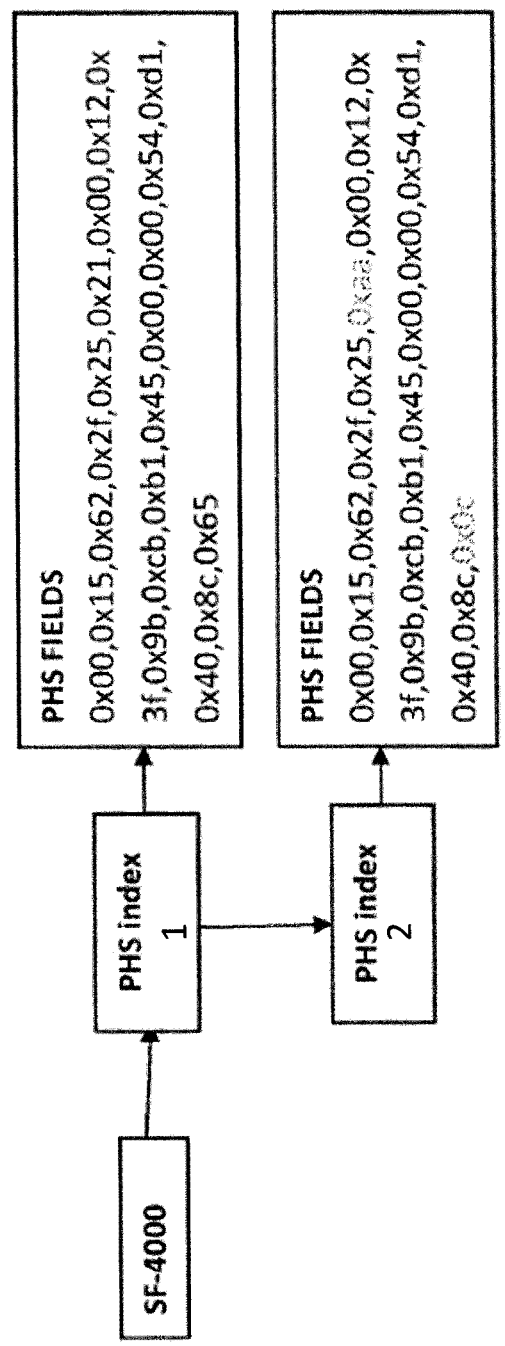

Continuing with the example above, for the packet that was not suppressible, the values of that packet can be used to create a new packet field suppression rule, as shown in FIG. 2B.

Figure 3:
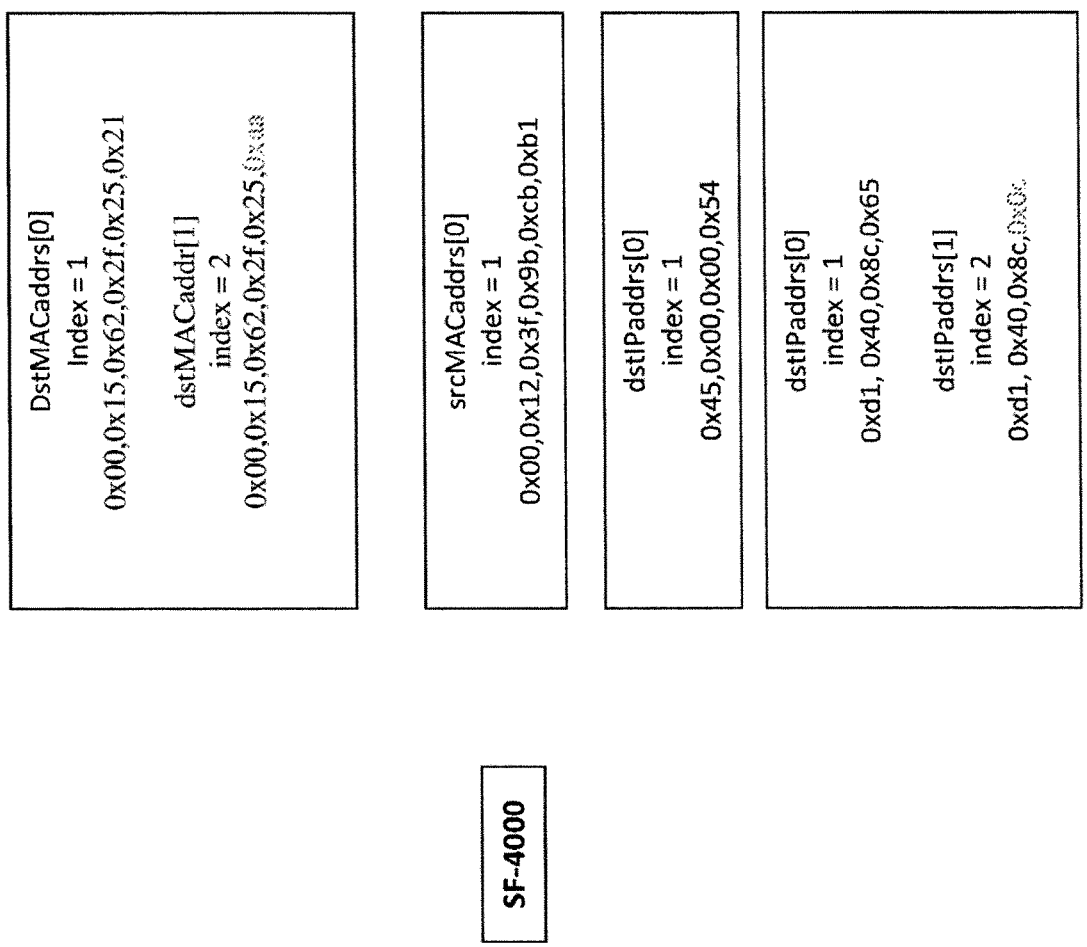
FIG. 3 is an example of a rule format in accordance with an illustrative embodiment of the invention.

The method can also involve assigning, by the first station, a packet field suppression index value to the new packet field suppression rule (Step 230). Continuing with the example above, for the packet that was not suppressible, the values of that packet can be used to create a packet field suppression index, as shown in FIG. 2A. In some embodiments, the rules can be stored in a table as is shown in FIG. 3.

The method can also involve transmitting, by the first station, the new packet field suppression rule and the packet field suppression index to the second station (Step 240). For example, for systems employing the IEEE 802.16 standard, the Dynamic ServiceFlow change message can be used to transmit the new packet field suppression rule and the packet field suppression index to the second station.

The method can also involve upon receipt of an acknowledgment by the second station, storing, by the first station, the new packet field suppression rule and the packet field suppression index (Step 250).

Figure 4:
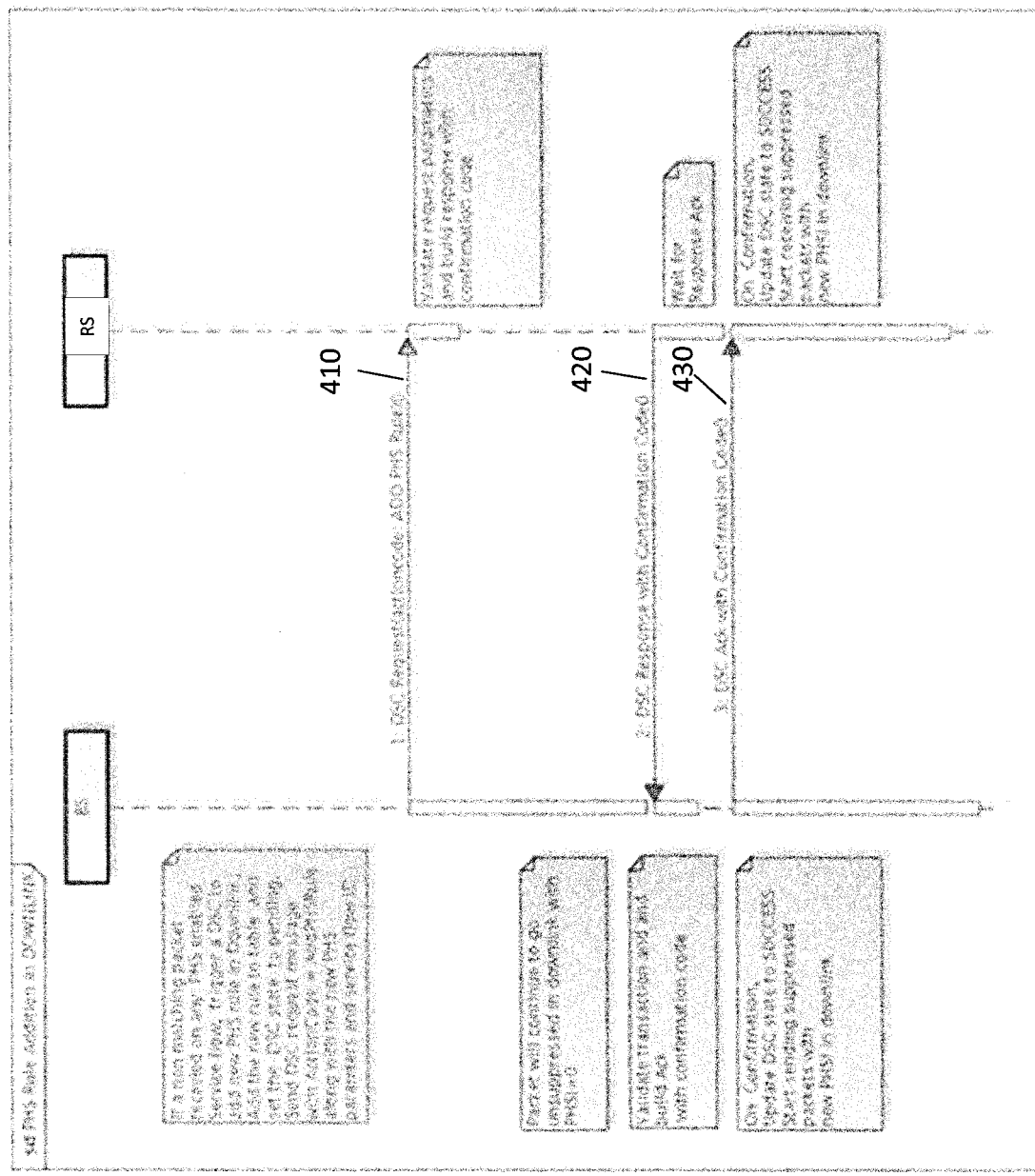
FIG. 4 is an example of a sequence diagram for a IEEE 801.16 standard system for which a PHS rule is added in a downlink, in accordance with an illustrative embodiment of the invention.

FIG. 4 is an example of a sequence diagram for a IEEE 802.16 standard system for which a PHS rule is added in a downlink, in accordance with an illustrative embodiment of the invention.

Assume a BS (e.g., first station) has a packet for which it cannot suppress, and creates a new rule (e.g., as described above with respect to FIGS. 1A, and 2B). A DSC request message 410 with the new rule is sent from the BS to a RS. Table 1 shows an example of a message format for the DSC request message 410:

TABLE 1

| Syntax | Size (bit) | Notes |
|---|---|---|
| DSC-REQ_Message_Format( ) { | | |
| Management Message Type = 14 | 8 | |
| TransactionID | 16 | |
| TLV specific information | variable | TLV-specific |
| -includes SF parameters and PHS parameters } | | |

The DSC request message can include a DSC action equal to add rule. The RS validates the new rule parameters and transmits a response message 420 with a confirmation code to the BS. Table 2 shows an example of a message format for the DSC request message 420:

TABLE 2

| Syntax | Size (bit) | Notes |
|---|---|---|
| DSC-REQ_Message_Format( ) { | | |
| Management Message Type = 15 | 8 | |
| TransactionID | 16 | |
| Confirmation Code | 8 | |
| TLV specific information | variable | TLV-specific |
| -includes SF parameters and PHS parameters } | | |

The BS on receiving the response message 420 can update its PHS rule storage (e.g., table or array as described above), and transmit a DSC acknowledgment message 430 to the RS. Table 3 shows an example of a message format for the DSC request message 430:

TABLE 3

| Syntax | Size (bit) | Notes |
|---|---|---|
| DSC-ACK_Message_Format( ) { | | |
| Management Message Type = 16 | 8 | |
| TransactionID | 16 | |
| Confirmation Code | 8 | |
| TLV specific information | variable | TLV-specific |
| -includes SF parameters and PHS parameters } | | |

After receiving the DSC acknowledgement message 430, the RS can update its PHS rule storage.

Each DSC process can have its own unique transaction ID to, for example, avoid conflict. In this manner, there can be multiple DSC processes running simultaneously.

In some embodiments, one or more rules can be deleted. For example, if the rules are stored on a table, when the table becomes full, rules can be deleted on a last in first out basis. In some embodiments, each time a new rule is added, a memory limit is checked. In some embodiments, a maximum number of rules is specified. The maximum number of rules can be configured (e.g., maximum number of rules can be 16).

Figure 5:
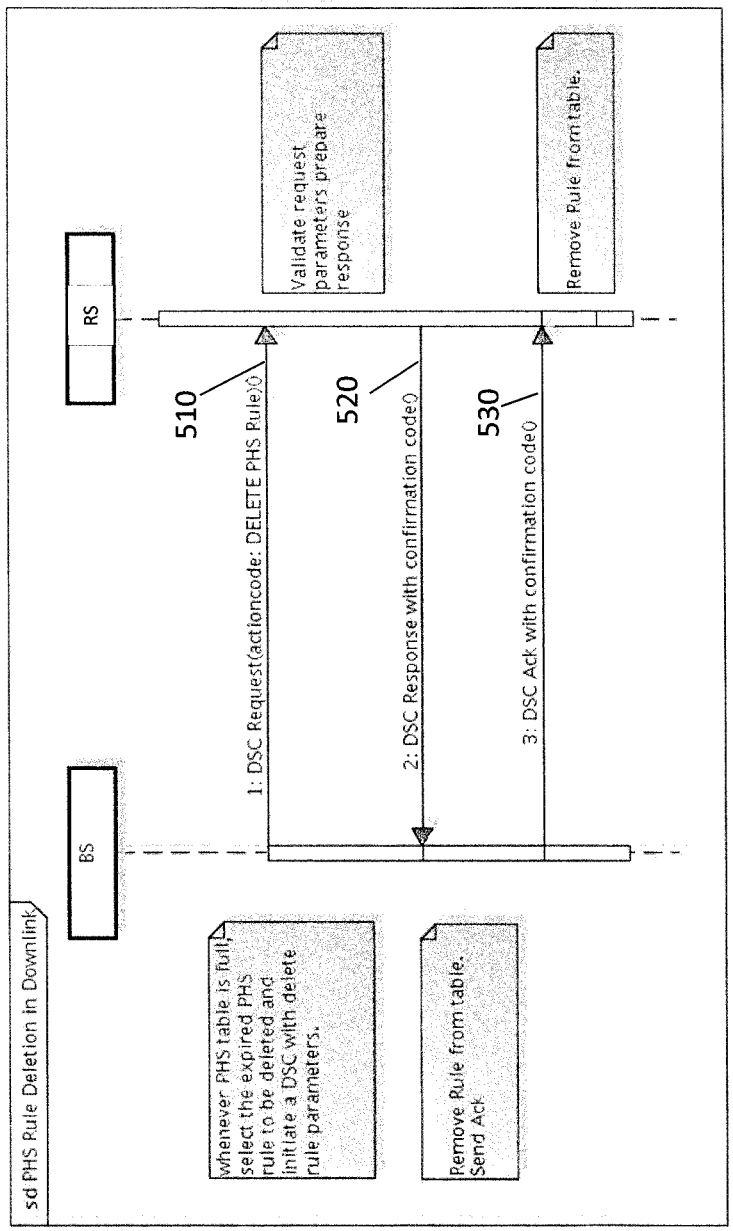
FIG. 5 is an example of a sequence diagram for a IEEE 801.16 standard system for which a PHS rule is deleted in a downlink, in accordance with an illustrative embodiment of the invention.

FIG. 5 is an example of a sequence diagram for a IEEE 801.16 standard system for which a PHS rule is deleted in a downlink, in accordance with an illustrative embodiment of the invention. The BS can transmit a DSC message 510 having an action to request deletion of a rule to the RS. The RS can validate the request, and transmit a response message 520 with a confirmation code. The BS can remove the rule from the table and transmit a DSC acknowledgment message 530 to the RS. The RS can remove the rule from the table.

In some embodiments, the BS stores a 32 bit integer value that specifies the absolute frame number. Each PHS rule can have an expiry frame number. When a packet undergoes suppression, the expiry frame number of the rule used for the suppression can be updated with a value which is the absolute frame number added to the age of the rule. When the BS deletes a rule, the BS can compare a current absolute frame number with the expiry frame to determine whether the rule can be deleted.

In some embodiments, all of the rules can be deleted (e.g., during a service flow deletion).

The sequence diagrams shown in FIGS. 4 and 5 be interchanged such that the BS and the RS are reversed.

It will be understood that the algorithms above are embodiments of the invention, and that the invention may be performed using similar techniques. Furthermore, although embodiments of the invention above have been described in connection with an IEEE 802.16 standard, other embodiments of the invention may be used in conjunction with other suitable wired or wireless networks, such as a Local Area Network (LAN), a Wireless LAN (WLAN), a Metropolitan Area Network (MAN), a wireless MAN (WMAN), a Wide Area Network (WAN), a Wireless WAN (WWAN), devices and/or networks operating in accordance with existing IEEE 802.16, 802.16d, 802.16e, 802.11a, 802.11b, 802.11g, 802.11n standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Single Input Single Output (SISO) transceiver, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time Division Multiple Access (TDMA), Extended TDMA (E-TDMA), General Packet Radio Service (GPRS), Extended GPRS, 3G systems (Code-Division Multiple Access (CDMA), Wideband CDMA (WCDMA), CDMA 2000, 4G systems (LTE, WiMAX) Interim Standard 95 (IS-95), Multi-Carrier Modulation (MCM), Discrete Multi-Tone (DMT), Bluetooth®, ZigBee™, or the like. Embodiments of the invention may be used in various other apparatuses, devices systems and/or networks.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for packet field suppression in broadband wireless communication, the method comprising:
   determining, by a first station, a packet to transmit to a second station, the packet comprising a plurality of fields;
   determining, by first station, whether one or more of the plurality of fields of the packet can be suppressed based on one or more rules, wherein the one or more rules include one or more expected values for one or more of the plurality of fields;
   if one or more of the plurality of fields can be suppressed, then suppressing, by the first station, the one or more of the plurality of fields that can be suppressed and transmitting the packet with the suppressed fields to a second station; and
   if one or more of the plurality of fields cannot be suppressed, then:
   i) sending, by the first station, the packet without suppressing any of the plurality of fields to the second station,
   ii) determining, by the first station, a new packet field suppression rule based only on one or more unexpected values for the one or more plurality of fields,
   iii) assigning, by the first station, a packet field suppression index value to the new packet field suppression rule,
   iv) transmitting, by the first station, the new packet field suppression rule and the packet field suppression index to the second station, and
   v) upon receipt of an acknowledgment by the second station, storing, by the first station, the new packet field suppression rule and the packet field suppression index.

2. The method of claim 1 wherein determining whether any of the plurality of fields can be suppressed further comprises comparing the one or more rules to MAC service data unit parameters.

3. The method of claim 1 wherein storing the new packet field suppression rule further comprises storing the new packet field suppression rule in a liner array.

4. The method of claim 1 wherein storing the new packet field suppression rule further comprises storing the new packet field suppression rule by creating a table for each unique field type of the new packet field suppression rule.

5. The method of claim 1 wherein transmitting the new packet field suppression rule and the packet field suppression index to the second station further comprises populating a dynamic service flow change message.

6. The method of claim 1 wherein the first station is a base station and the second station is a remote station.

7. The method of claim 1 wherein the first station is a remote station and the second station is a base station.

8. The method of claim 1 wherein the field to be suppressed are packet header fields.

9. The method of claim 1 wherein the packet is in accordance with IEEE 802.16 standards.

* * * * *